Oct. 5, 1943.   R. M. LA PORTE   2,331,033
WING GUN MOUNT
Filed July 17, 1941   4 Sheets-Sheet 1
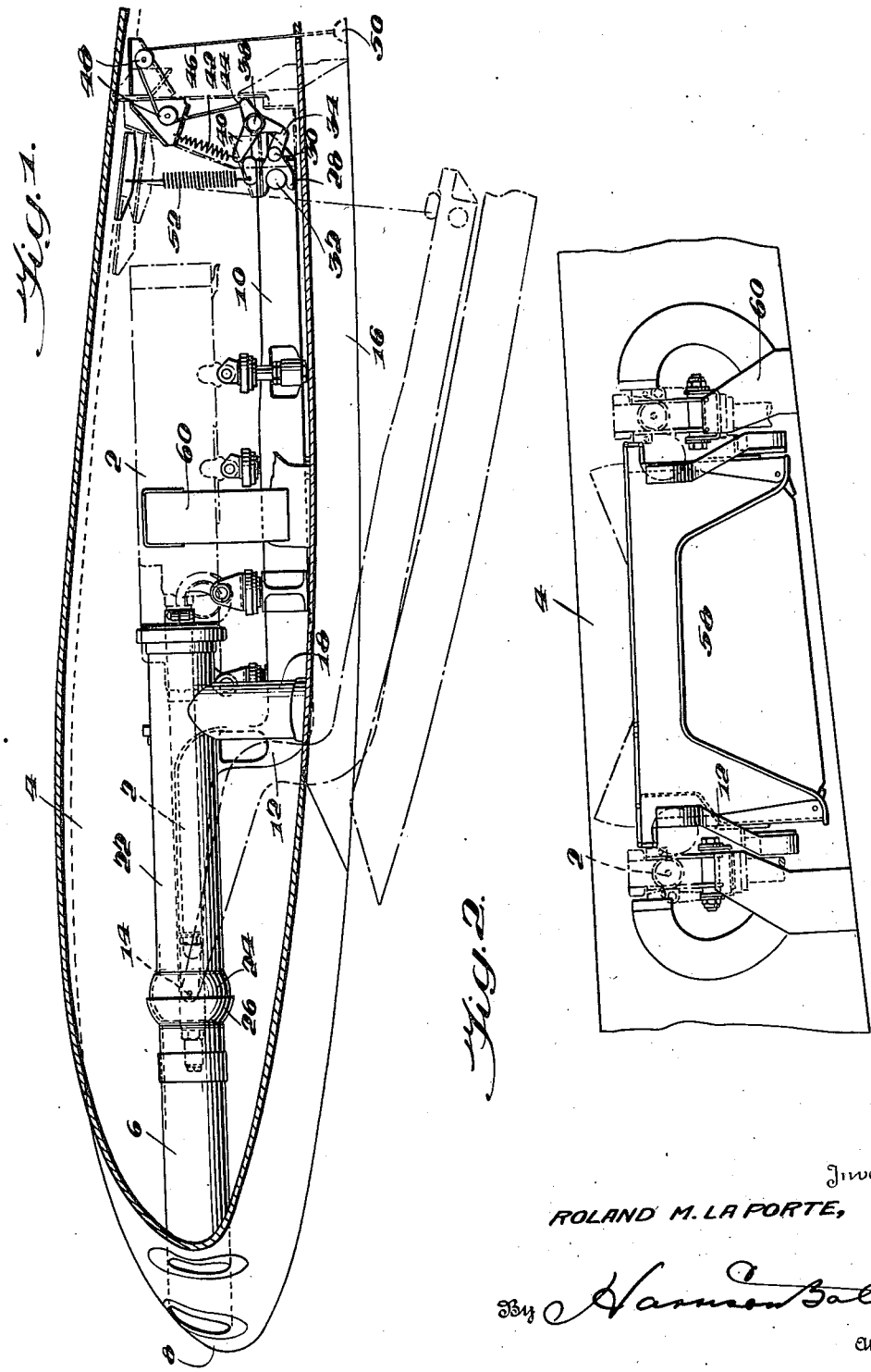
Inventor
ROLAND M. LA PORTE,
By Harrison Baler
Attorney

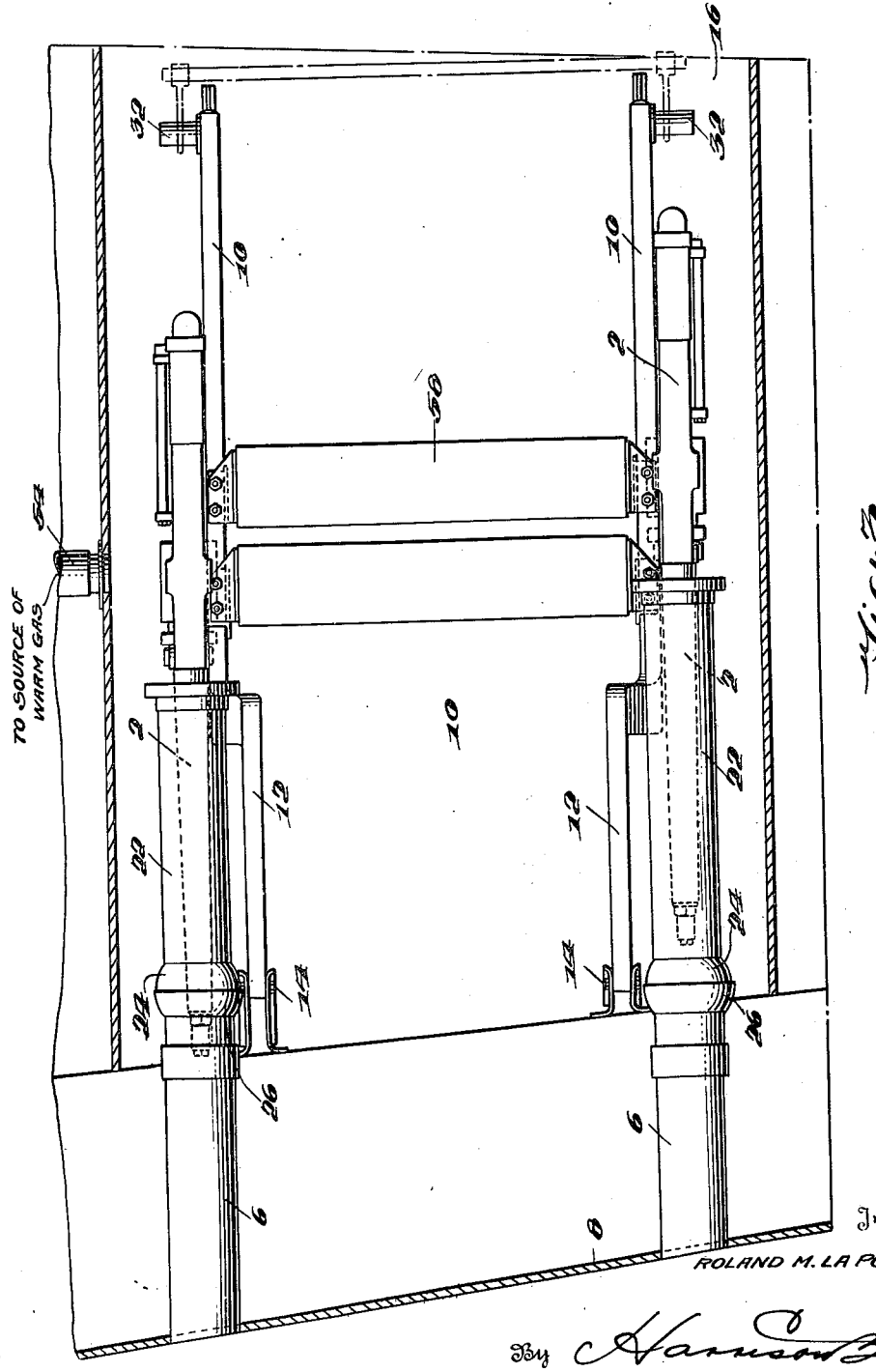

Oct. 5, 1943.   R. M. LA PORTE   2,331,033
WING GUN MOUNT
Filed July 17, 1941       4 Sheets-Sheet 3

Inventor
ROLAND M. LA PORTE,
By Harrison Bolen
Attorney

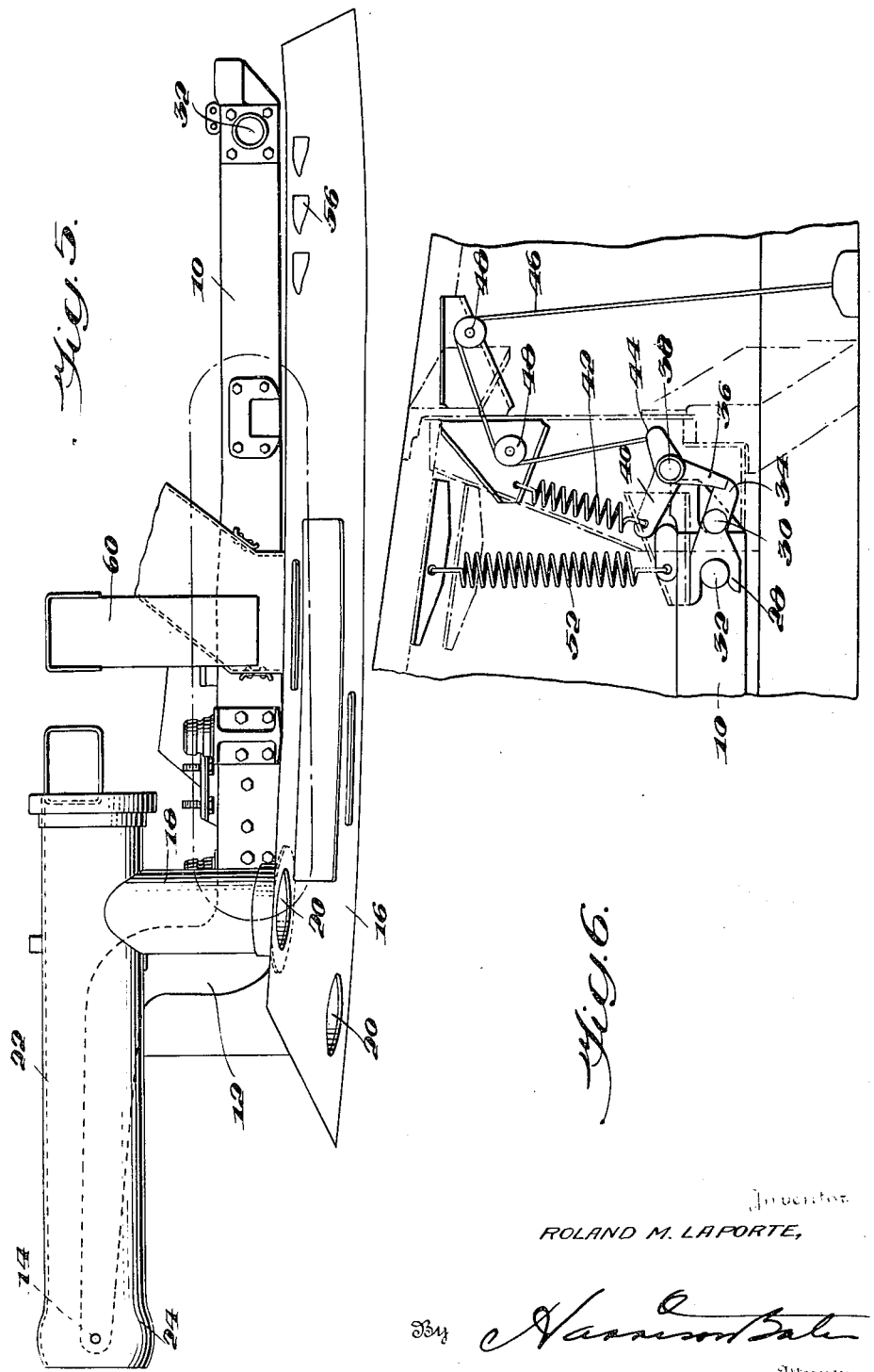

Patented Oct. 5, 1943

2,331,033

UNITED STATES PATENT OFFICE 2,331,033

WING GUN MOUNT

Roland M. La Porte, Parkville, Md., assignor to The Glenn L. Martin Company, Baltimore, Md.

Application July 17, 1941, Serial No. 402,750

16 Claims. (Cl. 89—37.5)

This invention relates to gun mountings and especially to gun mountings for aircraft.

In the mounting of guns in aircraft wings, servicing and reloading are likely to be difficult and slow. The primary object of the present invention therefore is to provide a mounting for a gun in the wing of an aircraft which makes it easy to load the gun or to get access to it for repairs.

Still another object of the invention is to provide a construction in which the gun can be swung out of the wing to an accessible position without removing it from the blast tube by which it is surrounded.

An additional disadvantage of wing guns is that because of their distance from the motors and fuselage they may become too cold for proper operation. A further object of the invention is to provide a simple and effective arrangement for furnishing heat to the guns.

In general, these purposes are accomplished by mounting the gun on a frame which is hinged at its front end to the wing and carries a part of the lower wing skin. A portion of the blast tube is made rigid with this frame and is joined to the remainder thereof by a ball and socket joint whose center is in the axis of the frame pivot.

Further objects of the invention will appear more fully from the following description, particularly when taken in conjunction with the accompanying drawings which form a part thereof.

In the drawings:

Fig. 1 shows in vertical cross-section a portion of an airplane wing provided with a gun mount embodying the invention;

Fig. 2 is a rear view thereof;

Fig. 3 is a top plan view;

Fig. 5 is a side elevation thereof; and

Fig. 6 is a detail view of a portion thereof.

Figure 4:
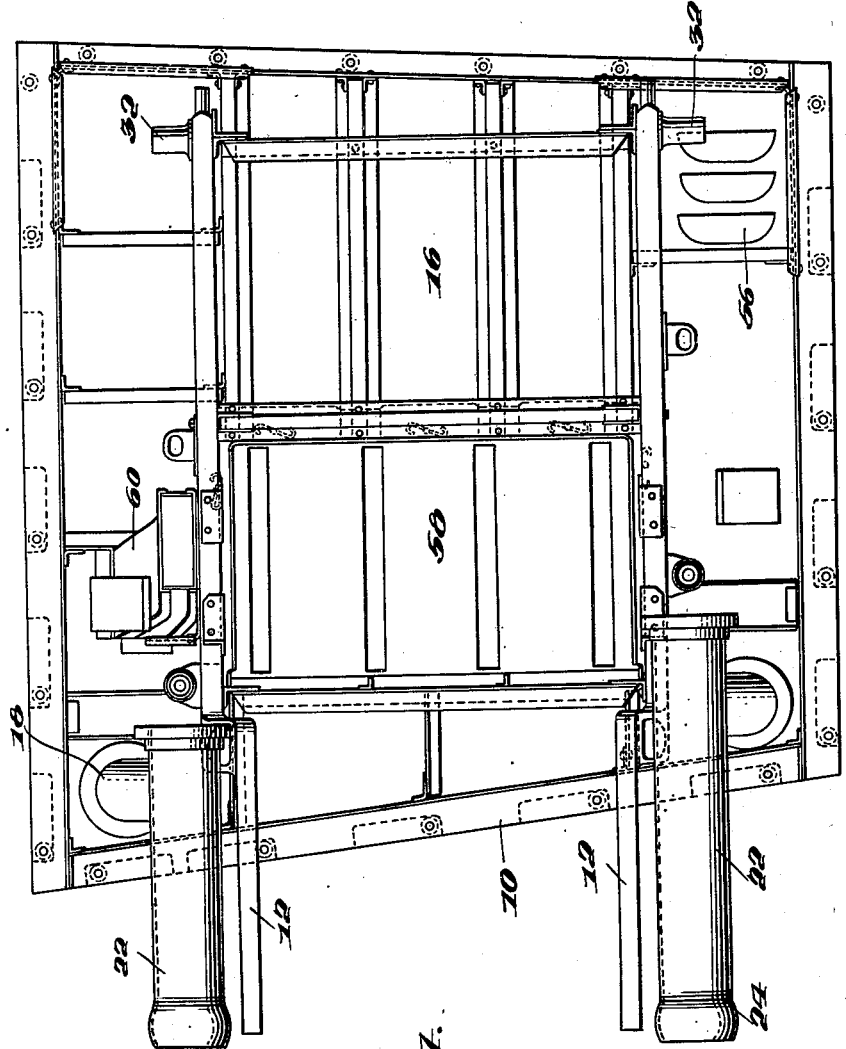
Fig. 4 is a plan view of the gun bed.

The invention as shown is adapted for the mounting of two guns 2 in an aircraft wing 4. These guns fire through blast tubes of which the forward portions 6 are fixed in the wing, opening through the leading edge 8 thereof.

The guns 2 are mounted on a frame indicated generally at 10. This frame has two forwardly extending arms 12 which are pivoted at 14 on the wing frame, so that the frame can swing from the solid line position of Fig. 1, in which the guns are within the wing, to the broken line position in which the guns can be reloaded or repaired. This movement takes place through an opening in the lower part of the wing, this opening being normally closed by a section 16 of the wing skin which is attached to the frame 10. When the frame is raised, this wing skin portion is flush with the surrounding wing surfaces so as to prevent any increase in aerodynamic resistance of the wing.

Carried by the frame 10 is the rear portion of the blast tube. This portion is of angular shape, having a vertical section 18 which terminates in an opening 20 in the wing skin section 16, and a horizontal section 22. Section 22 at its rear end fits closely to the gun barrel. At its front end, it is provided with a spherical enlargement 24 which fits into a hemispherical enlargement 26 on the rear end of front portion 6 so as to form a ball-and-socket joint therewith. It will be noted that the center of this joint lies in the axis of pivots 14 between the frame 10 and the wing. Furthermore, the joint is substantially air-tight so that outside air does not enter the chamber in which the frame and guns are located to any substantial extent.

Figures 1 and 6 show the mechanism for releasably holding the frame 10 in position within the wing. This consists of a V-shaped latch member 28 mounted on a pivot 30 and engageable over a pin 32 forming a part of frame 10. This latch member is normally held in locking position by the engagement of an arm 34, rigid therewith, with an arm 36 of a three-armed lever mounted on a pivot 38. A second arm 40 of this lever is connected to a spring 42 which normally holds the lever in locking position, while the third arm 44 is connected by a cable 46 running over pulleys 48 to a handle 50 arranged in an opening in the lower wing skin.

A coil spring 52 connected at one end to the frame 10 and at the other to the wing frame helps to counterbalance the weight of the frame and guns.

In order to prevent freezing of the gun mechanism, warm gas from any suitable source, such as the interior of a heated fuselage or the exhaust of the engine, is led to a pipe 54 at one side of the space in which the guns are located. This gas may exhaust through louvres 56 in the skin portion 10.

Ammunition is supplied to the guns from boxes 58 carried by frame 10, and the spent cartridges are discharged into chutes 60.

The device is operated as follows: When the guns are in use, the frame 10 is in its raised position within the wing in which it is shown in solid lines in Fig. 1. The guns may then be fired by any suitable remote control mechanism. When the guns are to be reloaded or repaired, handle 50 is pulled and removes lever arm 36 from the path of arm 34. The gun bed or frame can then pivot downwardly, turning latch 28 down so as to release pin 32. During this movement, the blast tube bends at the flexible joint 24, 26, and as this joint is coaxial with pivots 14 such movement does not disturb the proper relationship of the parts. When the gun is loaded, the frame 10 is restored to its raised position.

While I have described herein one embodiment of my invention, I wish it to be understood that I do not intend to limit myself thereby except within the scope of the appended claims.

I claim:

1. In combination, an aircraft wing having an opening therein, a cover for said opening, a gun frame mounted in said wing for movement into and out of the wing through said opening, said cover moving into and out of position with said frame.

2. In combination an aircraft wing having an opening therein, a gun and frame mounted in said wing for movement into and out of the wing through said opening, a portion of the wing skin being mounted on said frame.

3. In combination, an aircraft wing having an opening therein, a gun frame mounted in said wing for movement into and out of the wing through said opening, and a blast tube member fixed in said wing in a position aligned with a gun carried by said frame when the frame is within the wing.

4. In combination, an aircraft wing having an opening therein, a gun and frame mounted in said wing for movement into and out of the wing through said opening, and a blast tube member fixed in said wing in a position aligned with a gun carried by said frame when the frame is within the wing, a portion of the wing skin being mounted on said frame.

5. In combination, an aircraft wing having an opening therein, a gun frame pivoted in said wing for movement into and out of the wing through said opening, a blast tube having a portion fixed in said wing in a position aligned with a gun carried by said frame when the frame is within the wing and a portion rigid with said gun frame, and adapted and arranged to come into alignment with said first portion when the frame is within the wing.

6. In combination, an aircraft wing having an opening therein, a gun frame pivoted in said wing for movement into and out of the wing through said opening, a blast tube having a portion fixed in said wing in a position aligned with a gun carried by said frame when the frame is within the wing and a portion rigid with said gun frame, and a hinge joint having its axis coincident with the axis of pivoting of said frame and connecting said portions.

7. In combination, an aircraft wing having an opening therein, a gun frame pivoted in said wing for movement into and out of the wing through said opening, a blast tube having a portion fixed in said wing in a position aligned with a gun carried by said frame when the frame is within the wing and a portion rigid with said gun frame, a ball and socket joint having its axis coincident with the axis of pivoting of said frame and connecting said portions.

8. In combination, an aircraft wing having an opening therein, a gun frame pivoted in said wing for movement into and out of the wing through said opening, a blast tube having a portion fixed in said wing in a position aligned with a gun carried by said frame when the frame is within the wing and a portion rigid with said gun frame, a ball-and-socket joint having its axis coincident with the axis of pivoting of said frame and connecting said portions, a portion of the wing skin being mounted on said gun frame.

9. In combination, an aircraft wing, means forming a chamber in the wing open at the bottom, a gun frame hinged in said wing for movement into and out of the opening, a blast tube, a gun mounted on the frame and extending into the blast tube, said tube fitting around said gun to prevent air from the blast tube from entering said chamber, and means to conduct a warm gas to said chamber.

10. In combination, an aircraft wing having an opening therein, a gun frame pivoted in said wing for movement into and out of the wing through said opening, a blast tube having a portion fixed in said wing in a position aligned with a gun carried by said frame when the frame is within the wing and a portion rigid with said gun frame, adapted and arranged to come into alignment with said portion when the frame is within the wing, and a flexible joint connecting said portions.

11. In combination, an aircraft wing having an opening therein, a gun frame pivoted in said wing for movement into and out of the wing through said opening, a blast tube having a portion fixed in said wing in a position aligned with a gun carried by said frame when the frame is within the wing and a portion rigid with said gun frame, and adapted and arranged to come into alignment with said portion when the frame is within the wing, a flexible joint connecting said portions, a portion of the wing skin being mounted on said gun frame forming a closure for said opening.

12. In combination, an aircraft wing having an opening therein, a cover for said opening, a gun frame mounted in said wing for movement into and out of the wing through said opening, said cover moving into and out of position with said frame, and means for releasably locking the frame within the wing.

13. In combination, an aircraft wing having an opening therein, a cover for said opening, a gun frame mounted in said wing for movement into and out of the wing through said opening, said cover moving into and out of position with said frame, and means to conduct a warm gas to the space within the wing in which said frame is located.

14. In combination, an aircraft wing having an opening therein, a gun and frame mounted in said wing for movement into and out of the wing through said opening, a portion of the wing skin being mounted on said frame forming a closure for said opening, means to conduct a warm gas to the space within the wing in which said frame is located, said skin portion having apertures therein for the escape of such warm gas.

15. In combination, an aircraft wing, means forming a chamber in the wing open at the bottom, a gun frame hinged in said wing for movement into and out of the opening, a blast tube, a gun mounted on the frame and extending into the blast tube, said tube fitting around said gun to prevent air from the blast tube from entering said chamber, and means to conduct a warm gas to said chamber, said blast tube being formed of a first portion rigid with the wing and a second portion rigid with the frame, a ball-and-socket joint having its axis coincident with the axis of pivoting of said frame and connecting said portions, and means connecting the interior of the second portion with the exterior of the wing.

16. In combination, an aircraft wing, means forming a chamber in the wing open at the bottom, a gun frame hinged in said wing for movement into and out of the opening, a blast tube, a gun mounted on the frame and extending into the blast tube, said tube fitting around said gun to prevent air from the blast tube from entering said chamber, and means to conduct a warm gas to said chamber, said blast tube being formed of a first portion rigid with the wing and a second portion rigid with the frame, a ball-and-socket joint having its axis coincident with the axis of pivoting of said frame connecting said portions, and means connecting the interior of the second portion with the exterior of the wing, a portion of the wing skin being mounted on said gun frame, and said blast means extending through such wing skin portion.

ROLAND M. LAPORTE.